(12) United States Patent
May et al.

(10) Patent No.: US 12,454,421 B2
(45) Date of Patent: Oct. 28, 2025

(54) SWING ARM MANIPULATOR FOR DISPLACING OBJECTS ON AN OBJECT CARRIER SURFACE OF AN OBJECT CARRIER

(71) Applicant: AM-Flow Holding B.V., Amsterdam (NL)

(72) Inventors: Gideon May, Amsterdam (NL); Nick De Zwart-Janssen, Eindhoven (NL); Julien Maarten Jan Bol, Valkenswaard (NL); Jonathan Van Der Spek, Amsterdam (NL)

(73) Assignee: AM-Flow Holding B.V., Amsterdam (NL)

( * ) Notice: Subject to any disclaimer, the term of this patent is extended or adjusted under 35 U.S.C. 154(b) by 154 days.

(21) Appl. No.: 18/280,660

(22) PCT Filed: Mar. 8, 2022

(86) PCT No.: PCT/NL2022/050126
§ 371 (c)(1),
(2) Date: Sep. 6, 2023

(87) PCT Pub. No.: WO2022/191701
PCT Pub. Date: Sep. 15, 2022

(65) Prior Publication Data
US 2024/0140730 A1    May 2, 2024

(30) Foreign Application Priority Data

Mar. 8, 2021    (EP) ..................... 21161256

(51) Int. Cl.
*B65G 47/76* (2006.01)
(52) U.S. Cl.
CPC ................. *B65G 47/766* (2013.01)

(58) Field of Classification Search
CPC .................................. B65G 47/766
See application file for complete search history.

(56) References Cited

U.S. PATENT DOCUMENTS 702,408 A * 6/1902 Cook ............... B65G 47/766
186/35
3,006,457 A * 10/1961 Weiss ............... B65G 47/766
198/367

(Continued)

FOREIGN PATENT DOCUMENTS

CN    204168972 U  *  2/2015
EP     3693301 A1     8/2020

(Continued)

OTHER PUBLICATIONS

IPSearch History Aug. 27, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Leydig, Voit & Mayer, Ltd.

(57) ABSTRACT

An improved swing arm manipulator is provided for displacing objects on an object carrier surface of an object carrier. The swing arm manipulator includes a swing arm rotatable around a rotation axis transverse to the object carrier surface. The swing arm includes a hollow elongate body and at least one extension part. The at least one extension part has an at least substantially cylindrical portion with which it is rotatably arranged in a hollow inner space of the hollow elongate body and has an at least substantially wedge shaped portion connected thereto, that extends towards the object carrier surface at an angle with respect to a surface normal of the object carrier surface. The improved swing arm manipulator is better arranged to (Continued)

manipulate objects of various sizes, while mitigating the risk that objects get stuck and/or are damaged.

7 Claims, 9 Drawing Sheets

(56) References Cited

U.S. PATENT DOCUMENTS

| | | | | | |
|---|---|---|---|---|---|
| 3,236,361 | A | * | 2/1966 | Hackbarth | B65G 47/766 198/367 |
| 3,236,362 | A | * | 2/1966 | Hackbarth | B65G 47/766 198/367 |
| 3,543,916 | A | * | 12/1970 | Berk | B65G 47/766 198/525 |
| 5,010,998 | A | * | 4/1991 | MacMillan | B65G 47/766 198/367 |
| 5,027,939 | A | * | 7/1991 | Kilper | B65G 47/844 198/890 |
| 5,217,104 | A | * | 6/1993 | Pelletier | B65G 47/766 198/367 |
| 5,285,885 | A | * | 2/1994 | Hollingsworth | B65G 47/50 198/370.1 |
| 5,400,895 | A | * | 3/1995 | Hollingsworth | B65G 47/766 198/841 |
| 5,452,786 | A | * | 9/1995 | Gilmore | B65G 47/766 198/367 |
| 6,669,000 | B2 | * | 12/2003 | Wilson | B65G 47/766 198/367 |
| 6,910,568 | B1 | * | 6/2005 | Ydoate | B65G 47/766 198/367 |
| 10,787,320 | B2 | * | 9/2020 | Stronkhorst | B65G 35/08 |
| 11,267,660 | B2 | * | 3/2022 | Hoag | B65G 47/962 |
| 2007/0102325 | A1 | * | 5/2007 | Boffo | H02K 41/0358 209/225 |

FOREIGN PATENT DOCUMENTS

| | | |
|---|---|---|
| JP | H07206147 A | 8/1995 |
| JP | 3059624 B2 * | 7/2000 |

OTHER PUBLICATIONS

European Patent Office, International Search Report in corresponding International Application No. PCT/NL2022/050126, dated May 31, 2022 (2 pages).

* cited by examiner

SWING ARM MANIPULATOR FOR DISPLACING OBJECTS ON AN OBJECT CARRIER SURFACE OF AN OBJECT CARRIER

CROSS-REFERENCE TO RELATED APPLICATIONS

This patent application is a U.S. National Phase of PCT International Application No. PCT/NL2022/050126, filed Mar. 8, 2022, which claims priority to European Application No. 21161256.9, filed Mar. 8, 2021, which are both expressly incorporated by reference in their entireties, including any references contained therein.

FIELD

The present application relates to a swing arm manipulator and components thereof for use in a 3-dimensional object production facility.

The present application further relates to a sorting system for use in the 3-dimensional object production facility.

BACKGROUND

Additive manufacturing (AM) production facilities are versatile in that they allow production of many varieties of objects having characteristics which are only confined by the specifications of the product designer. In the AM industry physical three dimensional (3D) objects are produced by means of adding material in layers using mechanical or chemical deposition rather than removing material by mechanical or chemical processes. Objects manufactured by means of Additive Manufacturing are typically infinitely diverse in geometry with bounding box sizes ranging from less than 1 mm cubed to more than 40 cm cubed. This poses problems when automating production lines as the equipment that is used in handling the products cannot be designed in anticipation of any particular shape or template and therefore needs to solve the general problem for its problem domain specification. Also the materials used in an AM manufacturing process may be very diverse, ranging from glass to metal to nylon, to flexible polymers and therefore pose a similar problem to handling facilities in the sense that in the ideal case of a fully automated n=1 production facility offering a wide variety of material no assumption can be made on the material properties of the products. Therefore the handling equipment must be designed to solve the general case of handling the possible varieties of objects. Whereas the products may be very diverse, they may also share common steps in their manufacturing process, such as a curing process and a cleaning process. Other processing steps however are mutually different. For example mutually different objects may need mutually different color treatments. This necessitates sorting of objects at the output of a common processing stage. At least in the final stage, the objects should be sorted for delivery to the customer.

FIG. 1 is a picture showing an exemplary portion of an additive manufacturing (AM) production facility. On the left side thereof is depicted an outlet of a production facility that supplies manufactured objects with a conveyor belt to a sorting system having a plurality of swing arm manipulators 11a, 11b, 11n to push the objects in respective bins. By way of example, two objects O3, O4 are shown, of which the one O4 which is more stream downwards is relative compact and has a relatively large size. It can be seen on the right side of the picture that the swing arm of the swing arm manipulator 11n is already rotated inward so as to intercept the object O4 and direct it towards a corresponding bin. The other object O1, which is more stream upward has a plurality of relatively thin extensions.

The swing arm manipulator 11 as shown is of a conventional type, as for example described in Chinese utility patent CN204168972U. Whereas in many applications such a swing arm manipulator functions satisfactorily, the inventors recognized that is less the case for AM applications. This is based on the following observations. A conveyor belt as commonly used in production lines to transport the objects between the various production and handling devices ideally has a flat surface. In practice however, the surface becomes bulged due to thermal influences and forces acting thereon during use. This has to be taken into account. In order to achieve that the swing arm can operate at least substantially free of friction, either the conveyor belt needs to be frequently replaced, or a substantial tolerance is required between the conveyor belt and the swing arm. It has been observed however in additive manufacturing applications that the latter choice has as a consequence that smaller objects, or objects having small extensions, get frequently stuck between the swing arm of the swing arm manipulator 11 and the surface 23 of the conveyor belt as is illustrated for exemplary object O5 in the situation of FIG. 2. Not only does this involve the risk that such objects are damaged, but it severely hampers the operation of the production line as a whole, as a temporal interruption of operation is required to allow for manually removing the object. Accordingly, there is a need for an improved swing arm manipulator to address this issue.

It is noted that other methods are available to move objects off a transport carrier surface, such as by means of pneumatic forcing or robot-picking. Pneumatic forcing methods however are not suitable for handling the diversity of shapes that is typical in the AM industry as the surface-to-weight ratio of the objects is unknown, the surface shape itself is unknown and thus the direction of force applied to the object cannot be gauged with any precision leading to objects moving astray and/or being damaged. Robot picking is a method that works for a limited subset of shapes, and although novel machine-learning methods exist, it is currently limited to a small subset of shapes that are either known beforehand, or that have useful (ie pickable) protrusions or handles so they can be grabbed by robotic manipulators.

SUMMARY

It is an object of the present invention to provide a swing arm manipulator that at least mitigates these problems.

According to one aspect of the invention a swing arm manipulator for displacing objects on an object carrier surface of an object carrier is provided. The swing arm manipulator comprises a swing arm rotatable around a rotation axis transverse to the object carrier surface. The swing arm is characterized in that it comprises a hollow elongate body and at least one extension part.

The hollow elongate body has a length direction transverse to the rotation axis. The hollow elongate body defines at a side thereof facing the object carrier surface, an elongate opening extending in the length direction of the swing arm. The elongate opening gives access to a hollow inner space confined by an at least substantially cylindrical wall portion having an axis extending in the length direction and having a diameter greater than a width of the elongate opening.

The at least one extension part has an at least substantially cylindrical portion, and an at least substantially wedge shaped portion connected thereto. The an at least substantially cylindrical portion is rotatably arranged in the hollow inner space of the elongate body and the substantially wedge shaped portion extends towards the object carrier surface at an angle with respect to a surface normal of the object carrier surface.

As the substantially cylindrical portion of the at least one extension part is rotatably arranged in the hollow inner space defined by the an at least substantially cylindrical portion of the elongate body, the at least one extension part can freely rotate within an angular range around a rotation axis defined by the substantially cylindrical portion. The substantially wedge shaped portion which extends towards the object carrier surface will therewith rest on the object carrier surface as a result of gravitation. However, as the at least one extension part can freely rotate it can therewith follow height deviations occurring in the surface of the object carrier so as to mitigate the risk that a gap is formed between the object carrier surface and the wedge shaped portion.

In an embodiment, the at least one extension part has an intermediate portion, protruding through the opening, between the an at least substantially cylindrical portion and the an at least substantially wedge shaped portion. In this embodiment additional freedom of design is provided for the selection of the height elongate body above the object-carrier surface and the angle with which the wedge shaped portion inclines from the position where it rests on the object carrier surface.

In various examples the at least one extension part is one of a plurality of extension parts that are arranged subsequent to each other in the length direction. Therewith each one of the plurality of extension parts can individually adapt its angle of rotation about the rotation axis defined by the substantially cylindrical portion. The present disclosure further provides a selection device that in addition to an embodiment of a swing arm manipulator as described above, further comprises an actuator for controllably rotating the swing arm and an actuator controller for controlling the actuator in response to an object information signal that is indicative for an identity and/or one or more properties of an object in a neighborhood of the swing arm. In some examples the selection device comprises an object recognition unit for providing the object information signal. The object recognition unit may for example be configured to identify an object color, an object size, an object shape, object defects and the like, so that the actuator controller can properly control the actuator of the swing arm manipulator to achieve that the swing arm properly handles the object to which the object information signal is associated. It is not essential that the selection device has a proper object recognition unit. Alternatively, or additionally, the selection device may have an input for receiving the object information signal from an external object information source. An exemplary external object information source is a production device that is arranged stream upwards with respect to the selection device, wherein the object information signal from the production device indicates to the selection device a type of object that it has recently produced, and that is now being transported in the direction of the selection device.

In an embodiment, a selection device as disclosed herein is part of a sorting device that further comprises a conveyor belt forming an object carrier with an object carrier surface. In operation the conveyor belt moves in a transport direction and the actuator controller is configured to rotate the swing arm between a first orientation and a second orientation in response to the object information signal. In the first orientation the swing arm allows an object to be transported further with the conveyor belt and in the second orientation the swing arm blocks the object. Subsequently, upon returning to the first orientation it pushes the object from the conveyor belt, e.g. into a sorting bin or towards a further object transport carrier. In this arrangement the an at least substantially wedge shaped portion of the at least one extension part of the swing arm in the second orientation extends towards the object carrier surface in a direction opposite the transport direction.

In exemplary embodiments of the sorting device the at least one selection device is one of a plurality of similar selection devices. The selection devices have a respective swing arm at mutually distant positions along the transport direction of the conveyor belt and configured to remove an object from the conveyor belt to a respective destination. Additionally or alternatively one or more pairs of selection devices may have their swing arm arranged at mutually opposite sides of the conveyor belt. In some embodiments the plurality of selection devices comprise a common actuator controller. Using a common actuator controller for controlling a plurality of selection devices facilitates coordination between the selection devices and is cost effective.

A hollow elongate body for a swing arm defines an elongate opening at a side of the swing arm that extends in a length direction of the swing arm. The hollow elongate body is for example beam shaped and may have a length of 10 to 50 cm, where the elongate opening extends over substantially that length. The swing arm may at one of its longitudinal ends have a solid portion where it is to be mounted to an actuator. The elongate opening gives access to a hollow inner space confined by an at least substantially cylindrical wall portion having an axis extending in the length direction. The cylindrical wall is interrupted by the elongate opening. A width of the opening is less than a diameter of the at least substantially cylindrical wall portion. As an example, the hollow elongate body may have an external width of about 5 cm, the cylindrical wall portion may have a diameter of about 3 cm and the elongate opening may have a width of about 2.5 cm. However, many other selections are possible, provided that the diameter of the cylindrical wall exceeds a width of the elongate opening. Typically the an at least substantially cylindrical wall portion directly abuts at the outer surface of the swing arm. Alternatively, the hollow inner space confined by the an at least substantially cylindrical wall portion may be formed further away from the outer surface, in which case the elongate opening gives access to the hollow inner space via a slit.

An extension part for a swing arm as disclosed herein has an at least substantially uniform cross-section in a direction of a length axis. The extension part has an at least substantially cylindrical portion defined around the length axis with which it is to be accommodated in the inner space of the hollow elongate body. The extension part further has a beam shaped connection portion with a thickness smaller than a diameter of the cylindrical portion that extends radially away from the cylindrical portion. At side of the beam shaped connection portion away from the cylindrical portion it has an at least substantially wedge shaped portion. The wedge shaped portion extends further away from the cylindrical portion and defines an angle around the length axis between 100 and 170 degrees. The size of an extension part measured in the direction of the length axis is for example in the order of 1 to 10 cm. The diameter of the at least substantially cylindrical portion is for example in the order of 1 to 5 cm. The thickness of the beam shaped connection portion is smaller than the diameter of the cylindrical portion, for example about half the diameter. The wedge shaped portion may have a size measured from a side where it is connected to the beam shaped portion to a side where it is to rest on the object carrier surface of a few cm, for example 2 to 8 cm and may taper at an angle of 10 to 20 degrees.

Although the swing arm manipulator is particularly suitable for use in AM-production facilities, it may alternatively be used in other types of production facilities or product handling facilities.

BRIEF DESCRIPTION OF THE DRAWINGS

Embodiments of the swing arm manipulator for displacing objects on an object carrier surface of an object carrier are described in more detail in the following figures. Therein:

FIG. 3 shows the sorting device in a first phase;

FIG. 4 shows the sorting device in a subsequent phase; and

FIG. 5 shows the sorting device in a further subsequent phase;

DETAILED DESCRIPTION

Figure 1:
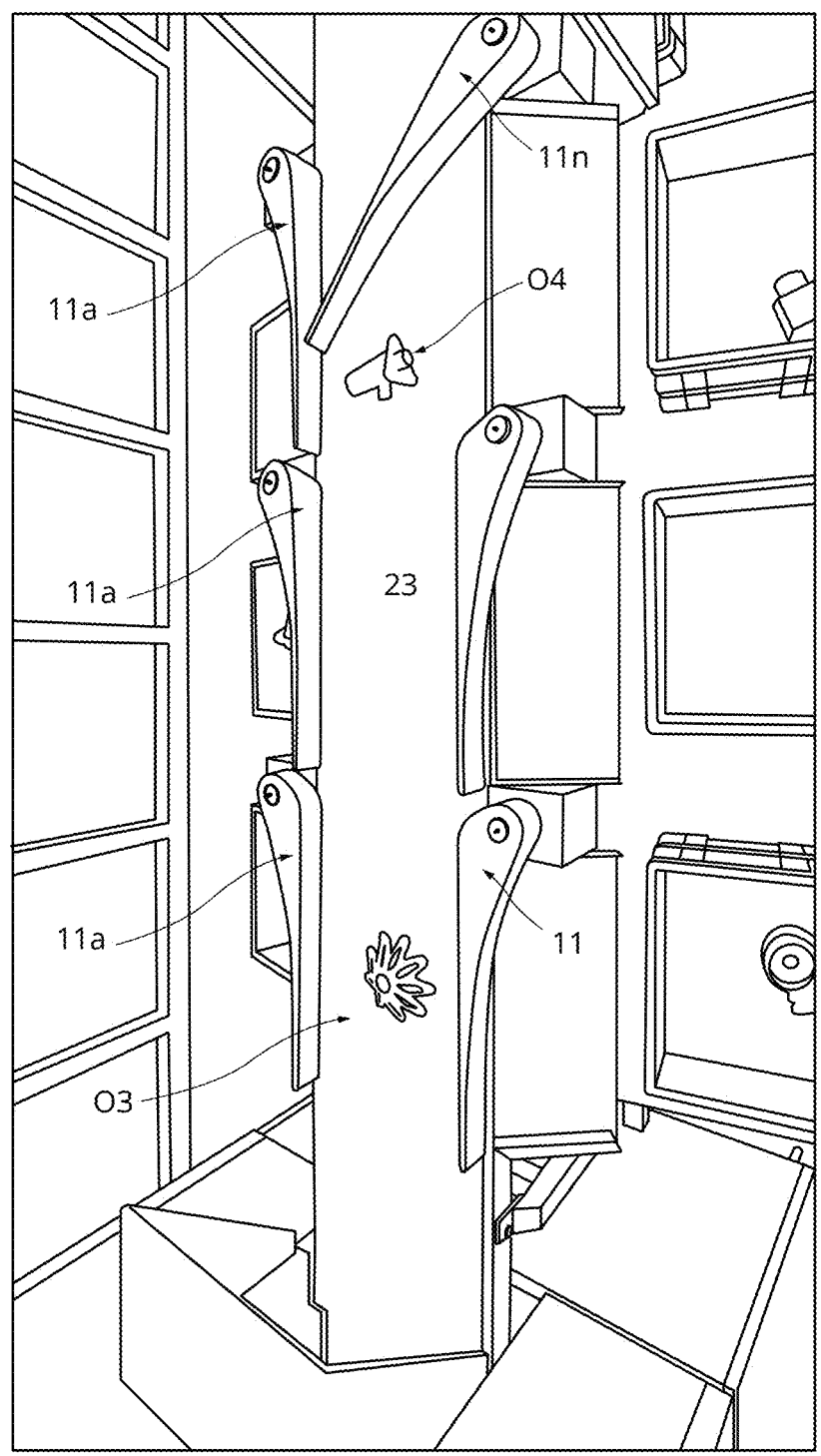
FIGS. 1 and 2 are pictures, showing an application using a prior art swing arm manipulator.
Figure 2:
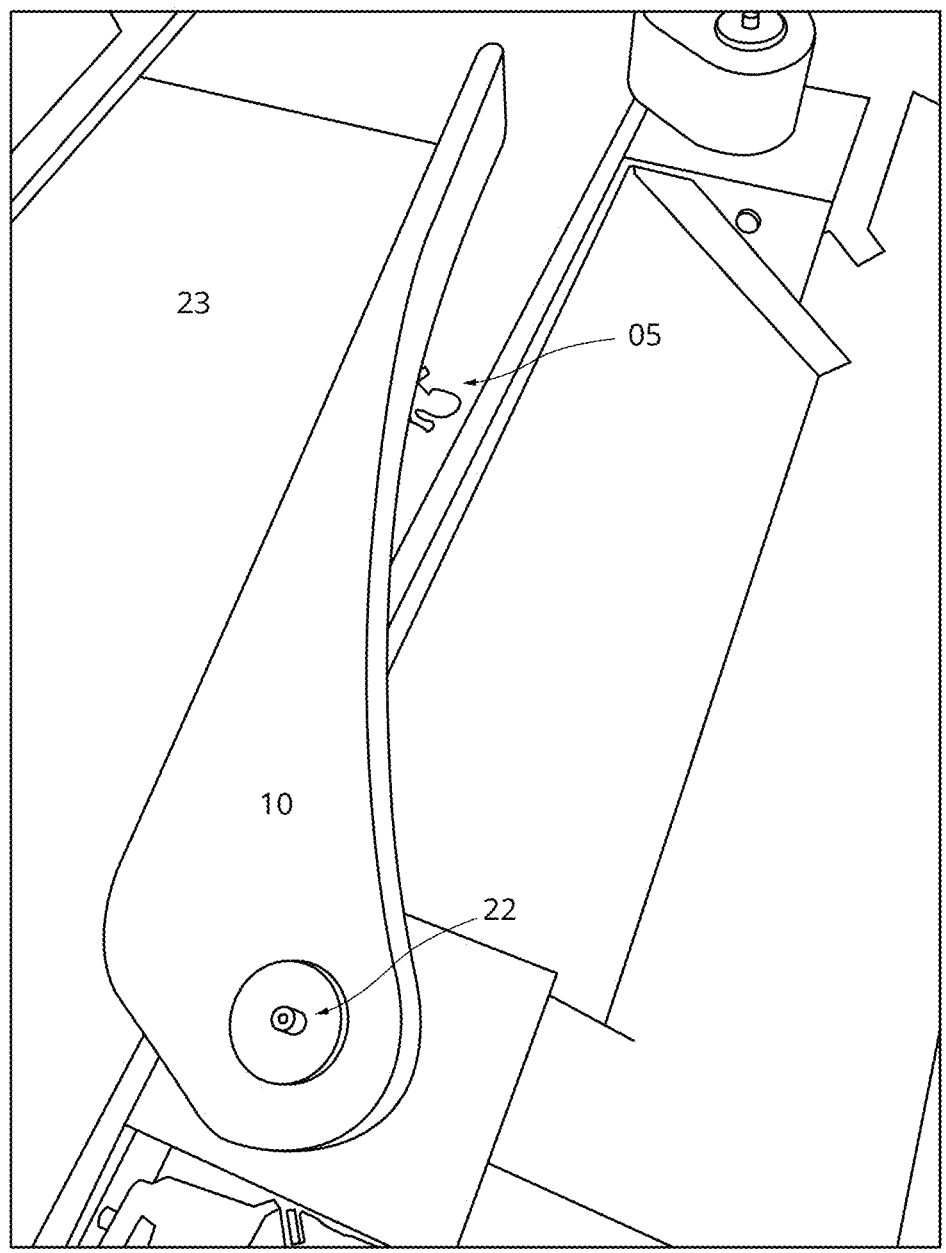
Figure 3:
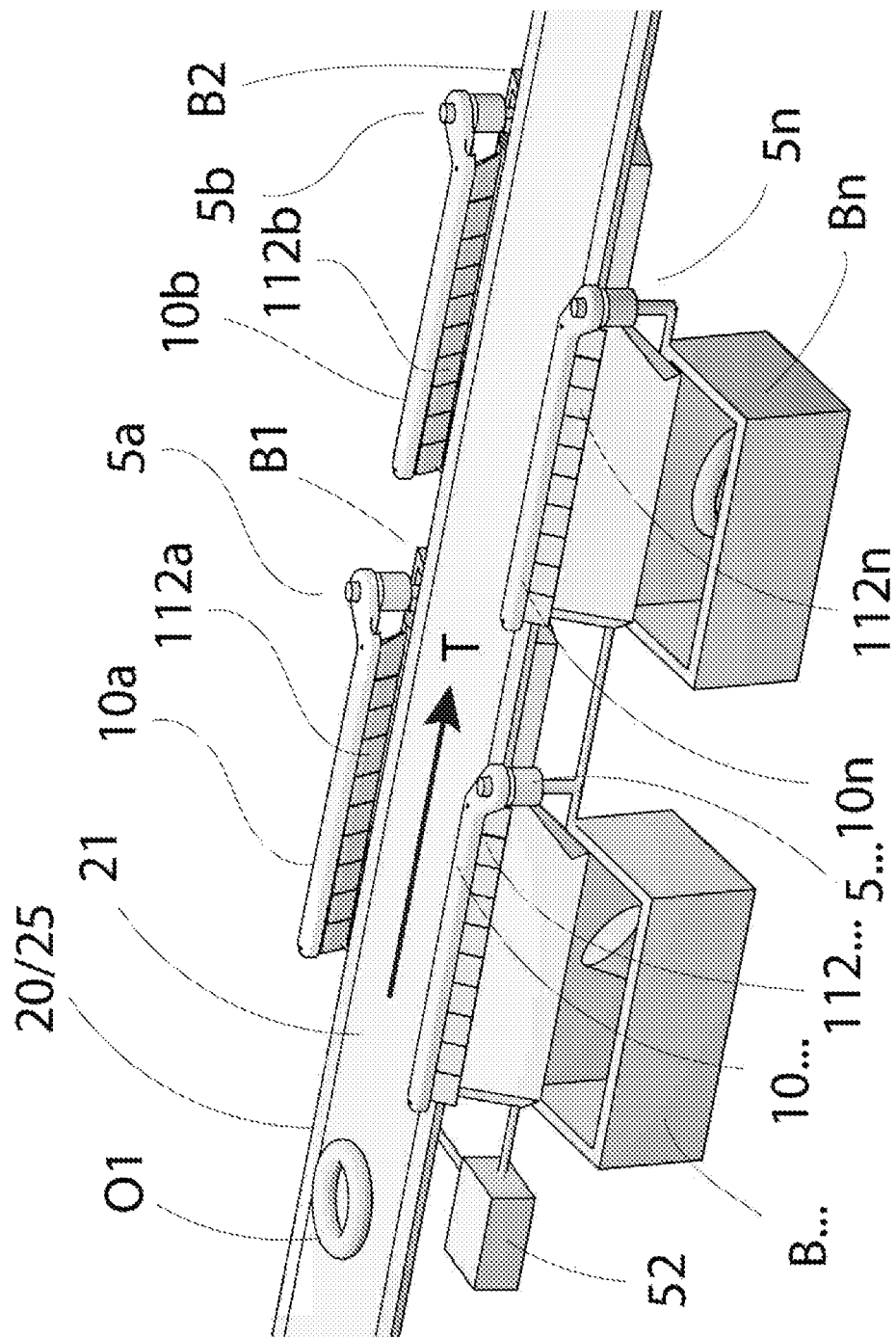
FIG. 3-5 shows an embodiment of an improved sorting device as disclosed herein, in mutually different phases of operation; Therein
Figure 4:
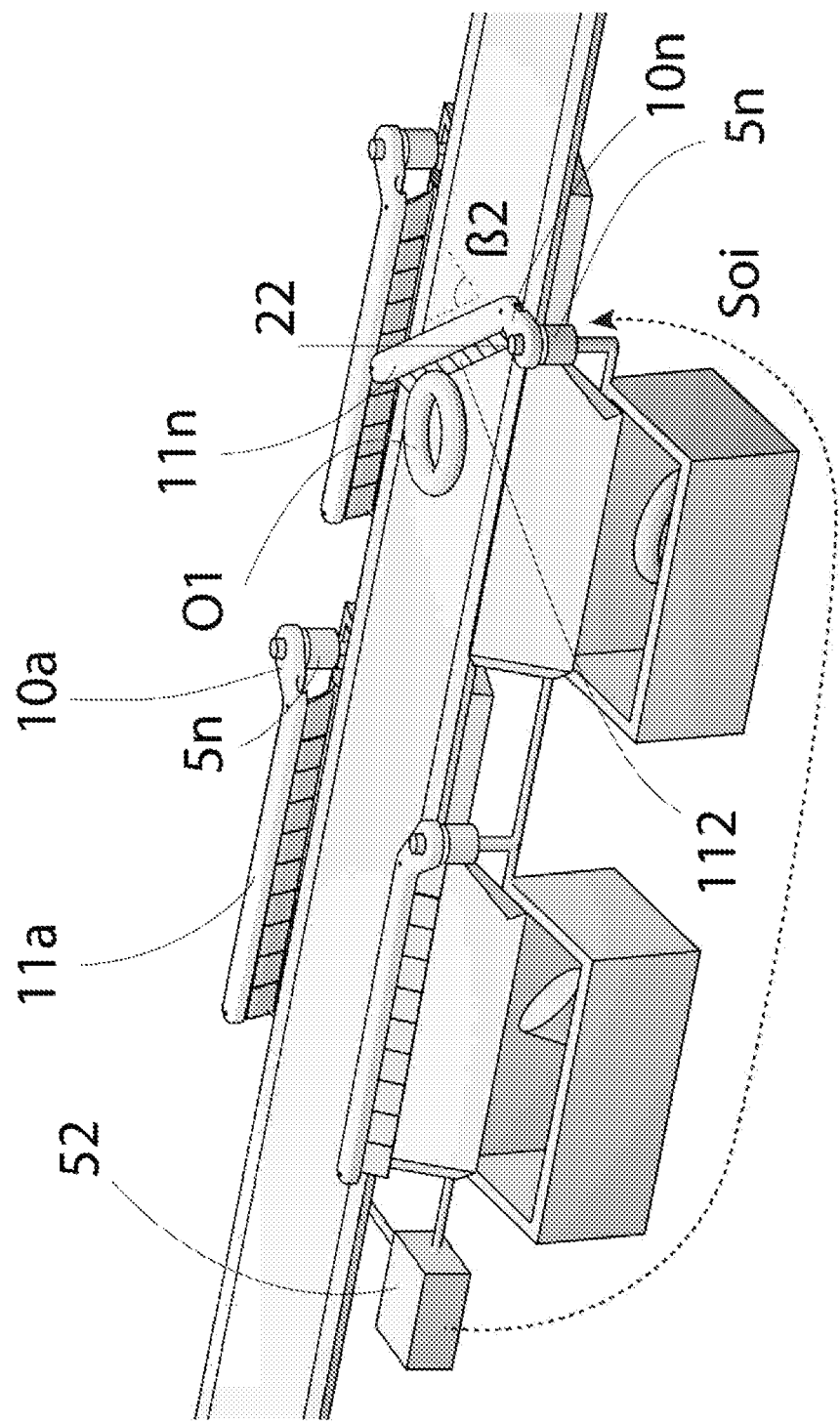
Figure 5:
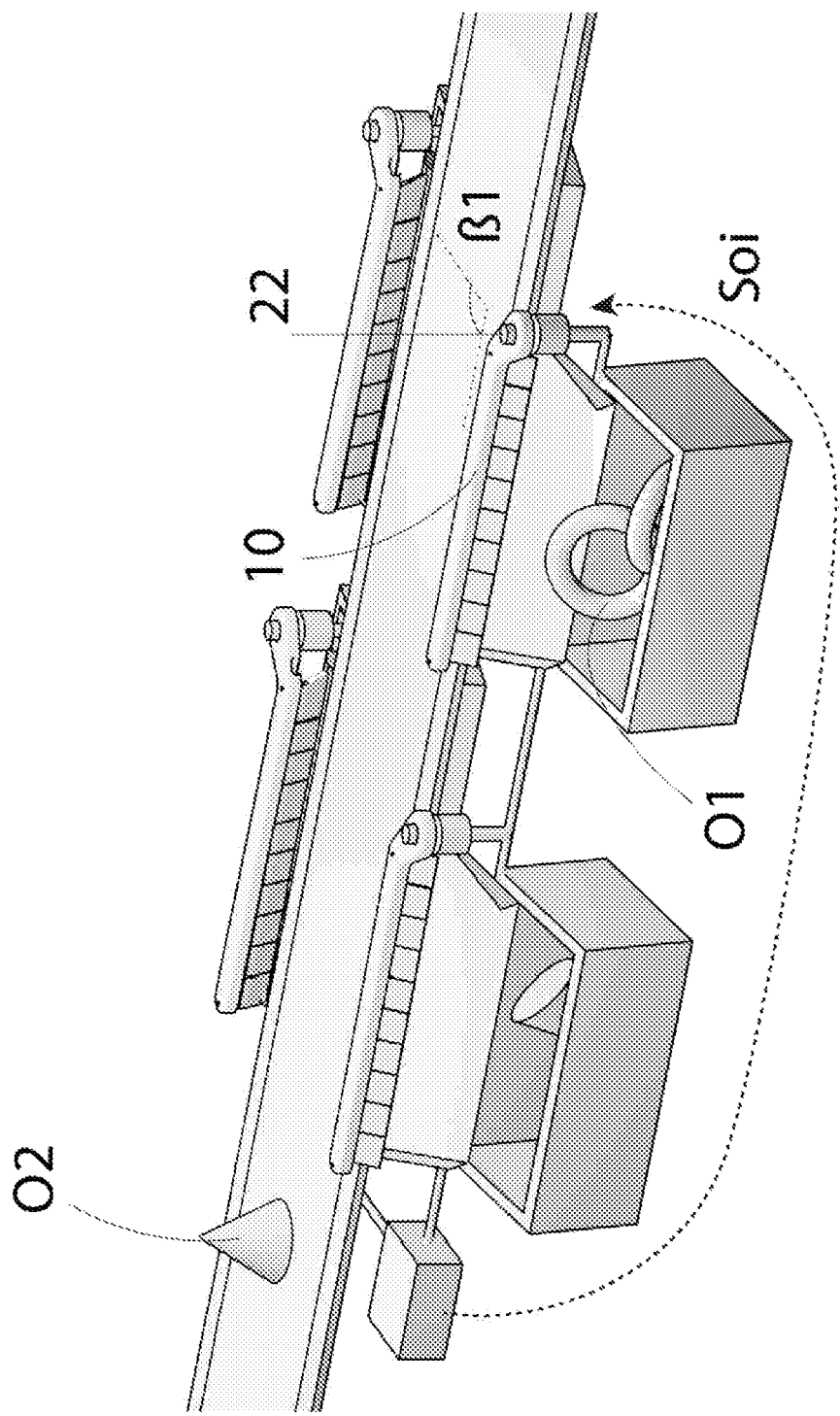

FIG. 3-5 show an embodiment of the improved sorting device in a first, a second and a third mutually subsequent phases of operation. In operation the sorting device displaces objects O1, O2, . . . on an object carrier surface 21 of an object carrier 20 moving in a direction T. As shown therein, the sorting device 1 has a plurality of selection devices 5a, 5b, 5n, that each comprise a swing arm manipulator 10. FIG. 3 shows the sorting device 1 in the first phase just before commencing a first stage of the operation cycle. In the situation shown in FIG. 3 the object carrier 20 carries an object O1 at its object carrier surface 21. Alongside the conveyor belt are depicted 4 out of a potentially large number of embodiments of swing arm manipulators 10a, 10b, 10n. As described in more detail with reference to FIG. 6-11, each swing arm employs a number of extension parts that are rotatably coupled with the swing arm to allow them to rotate freely along the longitudinal direction of the swing arm. Therewith the risk that small objects get stuck underneath the swing arm is substantially mitigated. The 'n' swing arm manipulators 10a, 10b, 10n have a respective actuator 5a, Sb, 5n to controllably rotate the swing arm connected thereto. To that end an actuator controller 52 is provided that controls the operation of the actuators in response to an object information signal. The actuator controller 52 on its turn is controlled by an external controller (not depicted).

The object information signal is indicative for an identity and/or one or more properties of an object in a neighborhood of the swing arm of the swing arm manipulator 10.

The actuator controller is configured to rotate the swing arm between a first orientation and a second orientation in response to the object information signal. In the first orientation the swing arm allows an object e.g. O1 to be transported further with the conveyor belt and in the second orientation the swing arm blocks the object. Subsequently when rotating back to the first orientation it removes the object from the conveyor belt into a respective bin B1, B2, Bn. In the situation shown in FIG. 3, the swing arms are each maintained in the first orientation. Hence, in this phase of operation the object O1 is transported further in the direction T.

FIG. 4 shows the embodiment of the sorting device of FIG. 3 in a second, subsequent phase of operation. The actuator controller 52 has sent an object information signal to the actuator 5n, so that it rotates the swing arm 11n of the swing arm manipulator 10n clockwise along the rotation axis 22 in the second orientation. Therein the swing arm is oriented under an angle (B2) with respect to the direction T of the conveyor belt. As the swing arm 11n rotates out onto the conveyor belt, the extension parts 112 underneath the swing arm are forced upward by the conveyor belt and lay flush to its surface 23 so as to prevent any thin object from getting stuck underneath the swing arm. The friction between the conveyor belt and the object that initially carries the object in the direction T, now causes the object to be pushed against the swing arm and its extensions. The reactive force normal to the swing arm then causes the object to be carried along the longitudinal direction of the swing arm towards the associated bin Bn.

FIG. 5 shows the sorting device of FIG. 3 and FIG. 4 in a third phase of operation succeeding the second phase. In a time interval between the second phase (FIG. 4) and the third phase (FIG. 5), the actuator controller 52 has sent a second object information signal (Soi) to the actuator 5n, and the actuator 5n is controlled so as to rotate counterclockwise along the rotation axis 22 so that the swing arm rotates back. During the movement of the swing arm directs the object O1 into the bin Bn, again using the extensions to prevent objects getting stuck underneath the swing arm. Upon completion of the counterclockwise rotation as shown in FIG. 5, the swing arm has assumed its initial position at the beginning of the operational cycle and forms an angle (B1) with respect to the axis perpendicular to the direction T of the conveyor belt.

Figure 6:
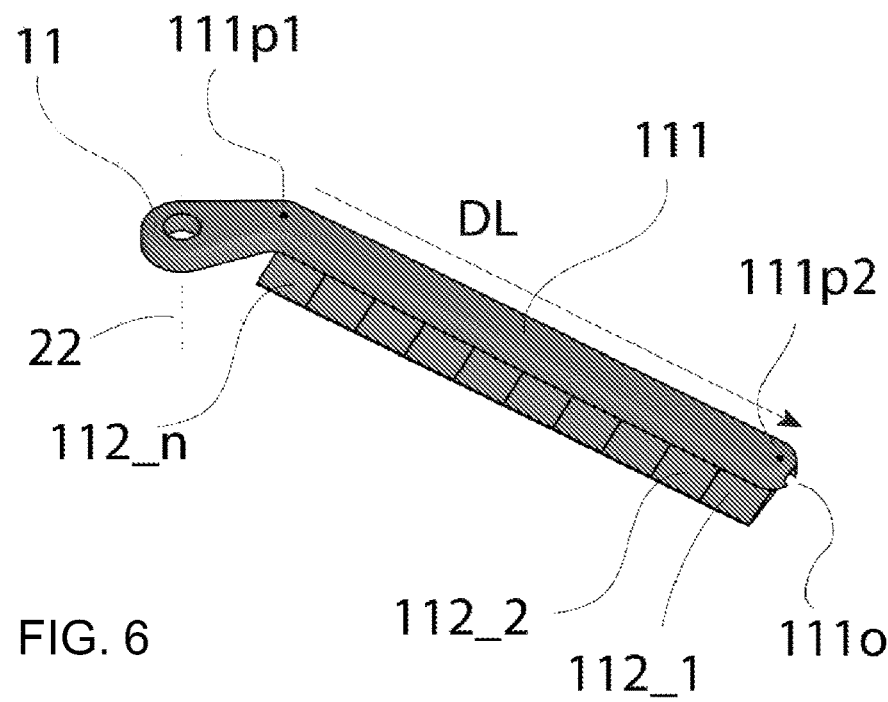
FIGS. 6 and 7 respectively show a perspective top view and a perspective bottom view of an embodiment of a swing arm used in the sorting device.

FIG. 6-11 shows various views of an exemplary embodiment of a swing arm 11 for use in the sorting device of FIG. 3-5. FIG. 6 shows the exemplary swing arm 11 in a 45-degree top view displaying its constituent parts. The large opening to the left allows for attachment to the shaft of the actuator 22. As shown in FIG. 6, the swing arm 11 has a hollow elongated body 111 with a cylindrical opening 111o into which a plurality of extension parts 112_1, 112_2, 112_n are slided with their cylindrical portion. The extension parts 112_1, 112_2, 112_n are free to move rotationally around an axis in the length direction DL in the cylindrical opening, and are held in place by the pins 111p1 and 111p2. The extension parts are arranged just tightly enough against each other so as to avoid substantial gaps between the adjacent extension parts, but loose enough so that gravitational forces can cause the parts to freely rotate in an orientation wherein the free end of the wedge shaped extension part rest on the conveyor belt.

In a practical embodiment the extension parts may have a width, defined in the direction DL not exceeding about 10 cm, e.g. about 5 cm. For example, a swing arm having a length of 50 cm may have 10 extension parts. Should the width be substantially larger than 10 cm then it becomes more difficult to adapt to bulges occurring in the object carrier, such as in a conveyor belt. Therewith the risk increases that small objects, or objects having small extending parts get trapped, unless the conveyor belt is frequently replaced, which would however involve high maintenance costs. The extension parts 112 are not tightly arranged with respect to each other in the hollow inner space 111h. This allows the extension parts to rotate freely relative to each other with respect to the axis defined by the cylindrical wall 114 of the hollow inner space 111h. Although a friction between mutually adjacent extension parts can be avoided with a minimum axial tolerance, the accumulated axial tolerance may be relatively high if a substantial number of extension parts is used. Therewith a relatively large axial gap between two mutually subsequent extension parts may arise if the other extension parts shift towards each other. This involves the risk that objects to be handled are trapped between such two subsequent extension parts. One option to avoid this to occur is to provide blocking elements in the hollow inner space 111h that restrict axial movements of the extension parts. This however complicates the assembly of the swing arm. For most practical applications it has been found that separate blocking elements for this purpose can be avoided if the extension parts have a width of at least 1 cm.

As shown in the accompanying figures, the substantially wedge shaped portion 112w extends towards the object carrier surface at an angle with respect to a surface normal of the object carrier surface. The wedge shaped portion 112w of the extension parts extends towards the object carrier surface in a direction opposite the transport direction. Accordingly, in the transport direction T the wedge shaped portion 112w inclines upward. In practical applications the inclination angle of a central plane of the wedge shaped portion is in a range of about 20 degrees to about 40 degrees.

In an embodiment, the hollow elongate body 111 is made from a light weight metal, such as aluminum. The hollow elongate body is for example manufactured using an extrusion process or a 3D-printing process. By way of example the extension parts are of a polymer, such as PA12 or Nylon. Likewise, the extension parts can be readily manufactured with a 3D printing process. The improved swing arm can be used as a replacement for a conventional swing arm, and does not require an adaptation of actuators or controllers to be used.

Figure 7:
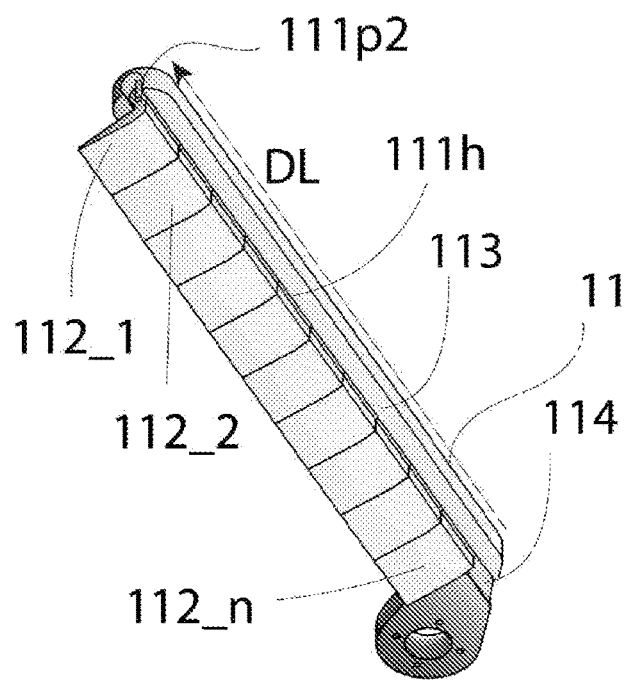

FIG. 7 shows the exemplary swing arm 11 in a 45-degree bottom view displaying the elongate opening 111o at a side 113 and extending in a length DL direction of the swing arm. The elongate opening 111o gives access to a hollow inner space 111h with a cylindrical wall 114 in which the extension parts 112_1, 112_2, 112_n are accommodated with their cylindrical portions. The extension parts 112_1, 112_2, 112_n are held in place at the end of the swing arm by a pin 111p2.

Figure 8:
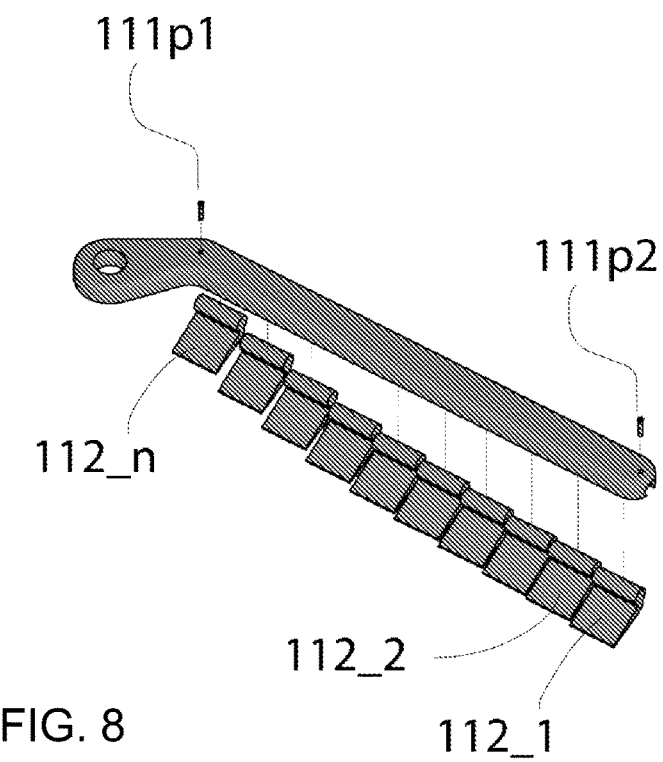
FIGS. 8 and 9 respectively show an 'exploded view' of the exemplary swing arm in a 45-degree top view and an 'exploded view' of the exemplary swing arm in a 45-degree bottom view.
Figure 9:
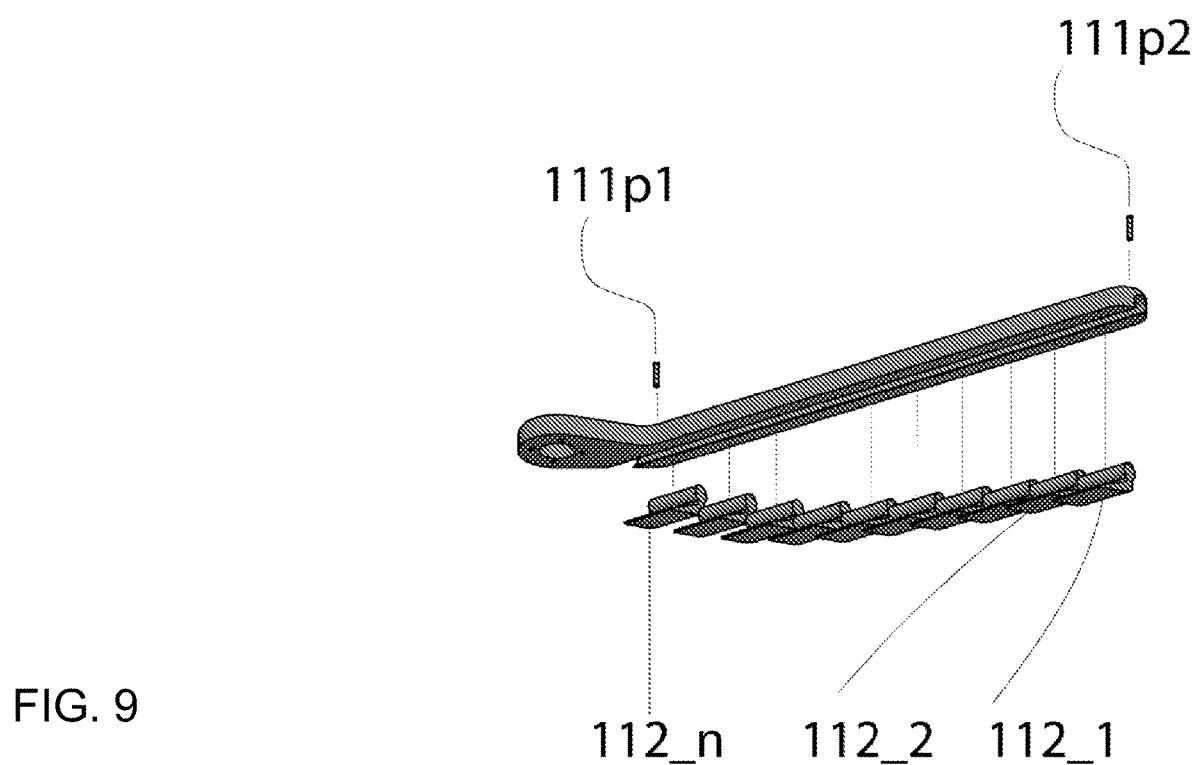

FIG. 8 and FIG. 9 respectively show an 'exploded view' of the exemplary swing arm in a 45-degree top view and an 'exploded view' of the exemplary swing arm in a 45-degree bottom view. These figures display in more detail the extension parts 112_1, 112_2, 112_n and the pins 111p1 and 111p2 that hold them in place. It is noted that alternative means may be used for this purpose, e.g. caps that are mounted at the ends of the swing arm. In some embodiments the hollow inner space 111h of the elongate body may not fully extend towards one end, so that a separate longitudinal holding element as a cap or a pin is not needed. In again other embodiments the elongate body may have a lower part facing the object carrier and an upper part facing away from the object carrier. In a manufacturing process the extension parts may be placed in the lower part of the elongate body and subsequently the upper part may be assembled with the lower part, for example using an adhesive or using screws.

Figure 10:
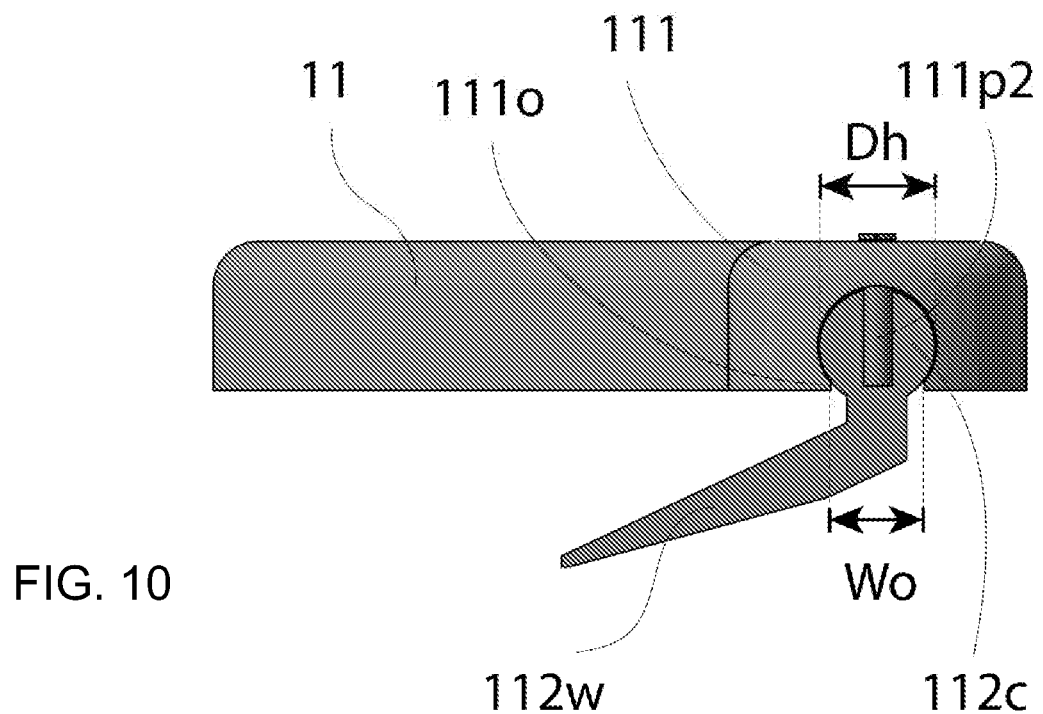
FIGS. 10 and 11 respectively show an orthogonal view of a first longitudinal end of the swing arm and an orthogonal view of a second longitudinal end opposite the first longitudinal end of the swing arm.

FIG. 10 shows a side view of the swing arm 11 at a longitudinal end thereof remote from the end where it is to be fixed to the actuator. FIG. 10 shows in more detail that the hollow inner space 111h is confined by an at least substantially cylindrical wall portion 114 that has a diameter Dh exceeding the width Wo of the elongate opening 111o in. FIG. 10 further shows one of the extension parts having its cylindrical portion 112c rotatably arranged within the hollow inner space 111h, and having its wedge-shaped extension 112w extending outwards. In a vertical direction in FIG. 10, the cylindrical portion 112c of the extension part is confined hollow inner space 111h due to the fact that the diameter of the cylindrical portion 112c which is only slightly smaller than the diameter Dh of the cylindrical wall portion 114 exceeds the width Wo. In the longitudinal direction the cylindrical portion 112c of the extension part is confined by the pin 111p2.

Figure 11:
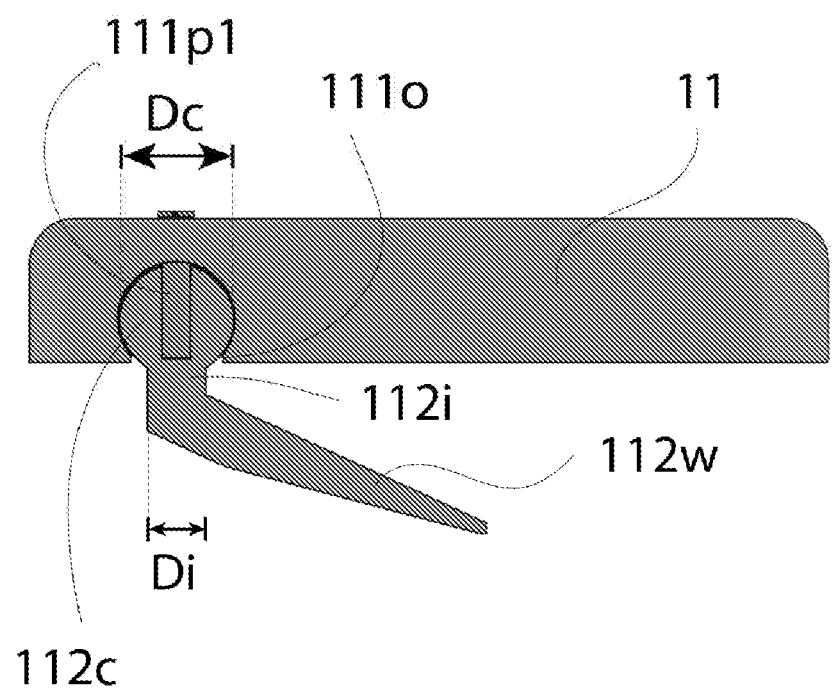

FIG. 11 shows the swing arm 11 at a longitudinal end thereof where it is to be fixed to the actuator. As shown therein, the extension part has a beam shaped connection portion 112i between its cylindrical portion 112c and its wedge-shaped extension 112w. The beam shaped connection portion 112i has a thickness Di smaller than the thickness Dc of its cylindrical portion 112c. The thickness Di is also smaller than the width Wo of the opening, so that the extension part can freely rotate with its cylindrical portion 112c in the hollow inner space within an allowed rotation range. The extension part shown at this longitudinal end is being held in place by the pin 111p1.

By way of example a plurality of selection devices as presented above are installed along a conveyor belt so that it form a sorting device. A control device such as disclosed in International Patent Application No. PCT/NL2020/050467—"3D product identification with neural network" may serve as a master controller. In such an arrangement, the identifying device of the control device is configured to identify the object on the conveyor belt and to send a control signal to the sorting device instructing it to push the object off the conveyor belt at the appropriate time/location so that it ends up in the proper bin and thus gets 'sorted'.

Figure 12:
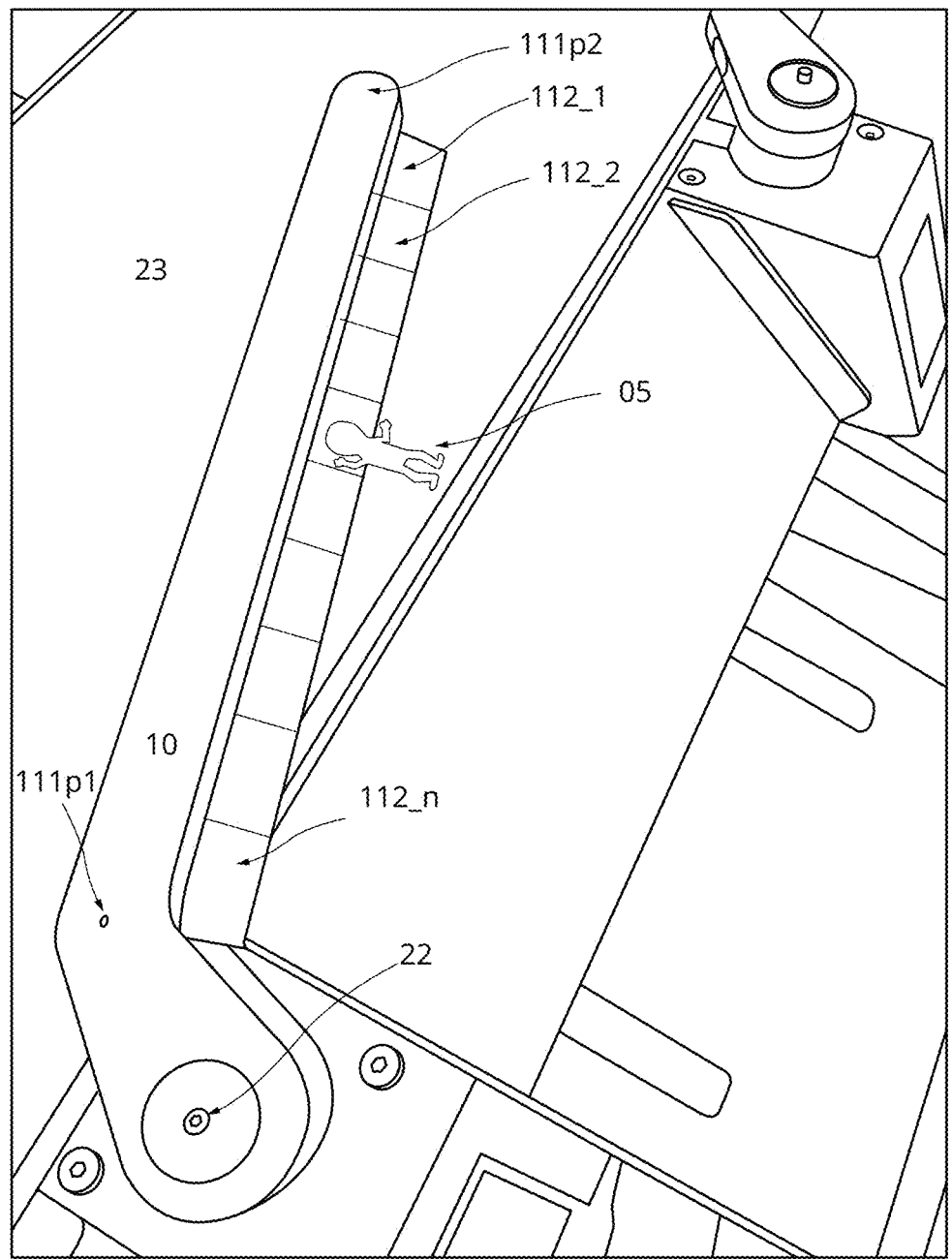
FIG. 12 is a picture, showing an application using the improved swing arm manipulator.

FIG. 12 is a picture showing an application using the improved swing arm manipulator. In the situation shown, the swing arm of the swing arm manipulator 10 is currently actuated to push an object O5 from the object carrier surface 23 into a collection bin. In this case the extension parts 112_1, 112_2, 112_n that are rotatably coupled to the swing arm 11 rest on the surface 23 of the conveyor belt therewith avoiding gaps, so that the risk that thin objects, like O5 or objects having thin extensions get trapped between the swing arm 11 and the surface 23 of the conveyor belt is minimized. It is noted that gravitation is sufficient to achieve that the wedge shaped portions of the extension part follow the object carrier surface. In some cases it may alternatively or additionally be considered to use resilient means for this purpose.

The invention claimed is:

1. A sorting device comprising:
a conveyor belt forming an object carrier with an object carrier surface, which conveyor belt in operation moves in a transport direction; and
at least one selection device comprising:
   a manipulator with a movable arm for displacing objects on the object carrier surface of the conveyor belt; and
   an actuator for controllably moving the movable arm; and
   an actuator controller for controlling the actuator in response to an object information signal indicative for an identity and/or one or more properties of an object in a neighborhood of the manipulator for displacing objects on the object carrier surface of the object carrier,
   wherein the moveable arm comprises:
      a hollow elongate body having a length direction parallel to the object carrier surface, defining at a side of the hollow elongate body facing the object carrier surface, an elongate opening extending in the length direction of the moveable arm, giving access to a hollow inner space confined by an at least substantially cylindrical wall portion having an axis extending in the length direction and having a diameter greater than a width of the opening;
      at least one extension part with an at least substantially cylindrical portion, and an at least substantially wedge shaped portion connected thereto, the at least substantially cylindrical portion being rotatably arranged in the hollow inner space of the elongate body and the substantially wedge shaped portion extending towards the object carrier surface at an angle with respect to a surface normal of the object carrier surface,
      wherein the movable arm is a swing arm rotatable around a rotation axis transverse to the object carrier surface, and
      wherein the actuator is configured to controllably rotate the swing arm;
   wherein the actuator controller is configured to rotate the rotatable arm between a first orientation and a second orientation in response to the object information signal, wherein in the first orientation the rotatable arm allows an object to be transported further with the conveyor belt and wherein in the second orientation the rotatable arm blocks the object, and
   wherein the at least substantially wedge shaped portion of the at least one extension part of the rotatable arm extends towards the object carrier surface in a direction opposite the transport direction, and
   wherein an inclination angle of a central plane of the wedge shaped portion with respect to the transport direction is in a range of about 20 degrees to about 40 degrees.

2. The sorting device according to claim 1, wherein the at least one selection device is one of a plurality of selection devices that each have a respective rotatable arm at mutually distant positions along the transport direction of the conveyor belt and that are configured to remove an object from the conveyor belt to a respective destination.

3. The sorting device according to claim 2, wherein the plurality of selection devices comprise a common actuator controller.

4. The sorting device according to claim 1, wherein the at least one extension part has an intermediate portion between the an at least substantially cylindrical portion and the an at least substantially wedge shaped portion, and that protrudes through the elongate opening.

5. The sorting device according to claim 4, wherein the intermediate portion is a beam shaped connection portion that has a thickness that is smaller than the thickness of the cylindrical portion and that is also smaller than the width of the elongate opening.

6. The sorting device according to claim 1, wherein the at least one extension part is one of a plurality of extension parts that are arranged subsequent to each other in the length direction.

7. The sorting device according to claim 1, wherein the at least one extension part is of a polymer.

* * * * *